United States Patent [19]

Silhouette

[11] 4,369,658
[45] Jan. 25, 1983

[54] DEVICE FOR DETECTING DIFFERENCES IN THE SPEEDS OF ROTATION OF TWO SHAFTS

[75] Inventor: Jean-Max M. Silhouette, Melun, France

[73] Assignee: Societe Nationale d'Etude et de Construction de Moteurs d'Aviation, "S.N.E.C.M.A.", Paris, France

[21] Appl. No.: 197,528

[22] Filed: Oct. 16, 1980

[30] Foreign Application Priority Data

Oct. 16, 1979 [FR] France .................... 79 25647

[51] Int. Cl.³ .............. G01P 3/04; F02D 25/02; G05D 13/62
[52] U.S. Cl. .............................. 73/507; 73/510
[58] Field of Search ............ 73/507, 510, 535, 537, 73/550; 200/80 R; 318/310, 311; 60/700

[56] References Cited

U.S. PATENT DOCUMENTS

| | | | |
|---|---|---|---|
| 1,754,675 | 4/1930 | Frank | 73/510 |
| 1,856,024 | 4/1932 | Buchi . | |
| 2,094,196 | 9/1937 | Town | 73/537 X |
| 2,132,911 | 10/1938 | Wellton | 73/507 |
| 2,423,057 | 6/1947 | Thomas et al. | 73/507 |
| 2,861,638 | 11/1958 | Grosselfinger et al. | |
| 2,958,999 | 11/1960 | Hey . | |
| 3,699,288 | 10/1972 | Swoveland et al. | 73/535 |

FOREIGN PATENT DOCUMENTS 123632 9/1901 Fed. Rep. of Germany .
271622 6/1927 United Kingdom .

*Primary Examiner*—James J. Gill
*Attorney, Agent, or Firm*—Oblon, Fisher, Spivak, McClelland & Maier

[57] ABSTRACT

A device for detecting a difference between the speeds of rotation of two revolving shafts wherein a movable body is laid out between two dead-head systems mounted opposite one another and caused to rotate by each of the shafts in such a way that the body is displaced between two end positions, either suddenly if the sum of the tensions of the two systems is positive, or gradually if such sum is negative so as to measure, for example, the difference in speeds in a twin engine jet or to produce control devices or devices to trigger automatic systems.

8 Claims, 5 Drawing Figures

DEVICE FOR DETECTING DIFFERENCES IN THE SPEEDS OF ROTATION OF TWO SHAFTS

BACKGROUND OF THE INVENTION

1. Field of the Invention

The invention concerns a device which makes it possible to detect a difference between the speeds of rotation of two revolving shafts so that this difference in speeds may be noted on an appropriate device or so as to control the speed of rotation of one of the shafts as a function of the speed of rotation of the other shaft, or to trigger an automatic reaction when the difference in speeds of rotation of the two shafts reaches a given threshold.

2. Description of the Prior Art

Generally, when the speed of rotation of one shaft must be subject to the speed of rotation of another shaft, each speed of rotation is determined by using an independent rotational speed detector including dead-heads which revolve with the corresponding shaft, acting against a resisting spring to move a movable body, and the movable bodies on the two detectors of rotational speed are generally interconnected by a mechanism which, in the majority of cases, involves a system of levers and at least one cam. A device of this type is described in U.S. Pat. No. 2,861,638 of Sept. 19, 1957 by R. A. Grosselfinger et al.

Such devices have the drawback of being complicated, as they include two independent speed detectors each of which has a movable body and a resisting spring, as well as an intermediary mechanism interconnecting the movable bodies in each of the two detectors.

Another known type of device, for example that in U.S. Pat. No. 1,856,024 of Mar. 10, 1924, involves two independent ball-type regulators which influence one another by means of a coupling spring. However, these devices do not allow for a precise relationship in controlling the speeds of rotation of the two shafts, as the coupling has only a dynamic effect.

Moreover, there is no known mechanism for detecting differences in speeds of rotation which makes it possible to freely trigger an automatic device of any kind such as a micro circuit breaker or valve.

SUMMARY OF THE INVENTION

The purpose of the present invention is to produce an entirely mechanical device which is especially uncomplicated and makes it possible to compare the speeds of rotation of two revolving shafts, it being possible to use such a device either to obtain a readout of the difference between such speeds or to effect precise and constant control in accordance with a given standard of the speed of one as a function of the other, or, finally, to trigger an automatic device such as a cut-out or a hydraulic or pneumatic valve whenever the difference in speeds exceeds a given threshold.

To that end and in conformity with the invention, we propose a device for detecting a difference between the speeds of rotation of two revolving shafts, such device being characterized by the fact that it includes two systems of dead-heads mounted opposite one another and a movable body placed between the two dead-head systems, the latter being sensitive to the speed of rotation of each of the revolving shafts so as to transform the centrifugal force to which they are subjected into two opposing forces applied to the movable body in such a way that the movement of that body is determined by the difference between the speeds of rotation of the two shafts.

According to a first variant of the invention, the sum of the tension produced by the two dead-head systems is negative in such a way that the displacement of the movable body is representative of the difference between the speeds of rotation of the two shafts. The device according to the invention may then be used either to obtain a readout of that difference on an appropriate instrument, or to effect the control of one of the speeds as a function of the other in accordance with a precise standard.

According to a second variant of the invention, the sum of the tension produced by the two dead-head systems is positive in such a way that the movable body is sensitive to two determined values for the difference between the speeds of rotation of the two shafts, so that it can be displaced between two end positions. The device may then be used to trigger an automatic device without it being necessary for one system to interact with the other.

In accordance with the invention, the two customary rotation speed detectors are replaced by a single system which involves no opposing springs and consists only in a movable body arranged directly between the two dead-head systems. Each of the dead-head systems acts as if it were the opposing spring for the opposing dead-head system. Thus, depending on whether the sum of the tensions from the dead-head systems is negative or positive, the device according to the invention may be used to effect a measurement or control function, or to control an automatic device.

Moreover, the mechanism interconnecting each of the two movable bodies in the earlier devices is eliminated.

Control may be effected in different ways. Accordingly, the most simple relationship, which consists in making the speed of rotation $N_2$ of the regulated system equal to the speed of rotation $N_1$ of the reference system, may be obtained by using two identical dead-head systems and by equipping the movable body with an amplifier able to control the speed of rotation $N_2$ as a function of the body's movement. The neutral position of the amplifier is made to coincide with the neutral position of the movable body obtained when $N_1 = N_2$. This amplifier may be hydraulic, pneumatic or electronic. Likewise, the relationship consisting in making the speed of rotation $N_2$ of the regulated system equal to a multiple or submultiple of the speed of rotation $N_1$ of the reference system may be achieved by adding a device, in the above case a mechanism such as a system of gears, between at least one of the systems and the corresponding shaft of the device according to the invention. A relationship of the type $N_2 = f(N_1)$ may be obtained by adding to the device according to the invention a standard set of dead-heads sensitive to the speed of rotation $N_1$ so as to displace a body provided with a cam which determines the function to be achieved.

A lever working with the cam moves the sleeve in which the movable organ of the device according to the invention is displaced. The movable body and the sleeve are the detection unit for the hydraulic amplifier commanding the regulated system revolving at speed $N_2$. This conventional set of dead-heads may be replaced by a standard detector of pressure difference $\Delta P$, in such a way that the relationship between the speeds of rotation $N_2$ and $N_1$ is of the type $N_2 = N_1 \times f(\Delta P)$.

BRIEF DESCRIPTION OF THE DRAWINGS

Various other objects, features and attendant advantages of the present invention will be more fully appreciated as the same becomes better understood from the following detailed description when considered in connection with the accompanying drawings and wherein.

DETAILED DESCRIPTION OF THE PREFERRED EMBODIMENTS

Figure 1:
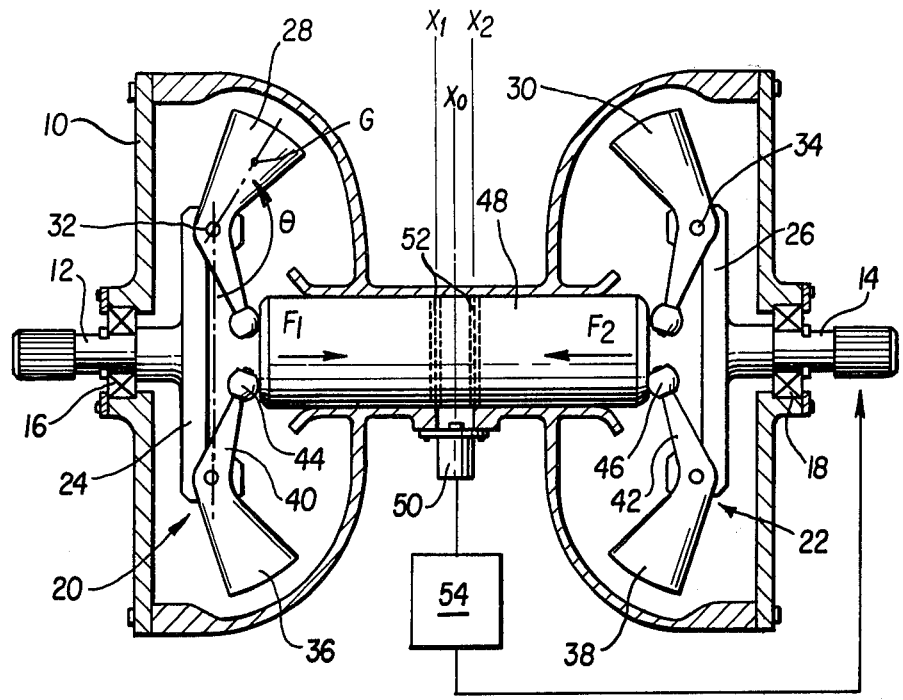
FIG. 1 is a longitudinal cross section of a device for detecting a difference between the speeds of rotation of the two revolving shafts which has been produced in accordance with the lessons of this invention, such device being such that the sum of the tensions from the two dead-head systems is negative.

The device represented in FIG. 1 includes a housing 10 with two identical and opposite plates crossed by two axially aligned revolving shafts 12 and 14 through two bearings 16 and 18, respectively. Each of the two shafts 12 and 14 supports, inside the housing 10, a dead-head system 20 and 22, respectively. The dead-head systems 20 and 22 are made up of plates 24 and 26 which are made of a piece with the shafts 12 and 14 and supporting, on their edges, V-shaped dead-heads 28 and 30 mounted so as to pivot around axes 32 and 34 which extend tangentially to the plates 24 and 26 and in radial planes with respect to the shafts 12 and 14. Each of the dead-heads 28, 30 has a head 36, 38 in which the greatest portion of the mass of the corresponding dead-head is concentrated and a tail 40, 42 which extends radially toward the interior to work through a roller 44, 46 with a movable body 48 mounted so as to slide within the housing 10. The body 48 is arranged coaxially with respect to the shafts 12 and 14 between the dead-head systems 20 and 22. By virtue of this arrangement, each of the dead-head systems 20 and 22 transforms the centrifugal force to which it is subjected by virtue of the rotation of the corresponding shafts 12 and 14 into two opposing axial forces $F_1$ and $F_2$, respectively, exerted on the movable body 48.

Figure 2:
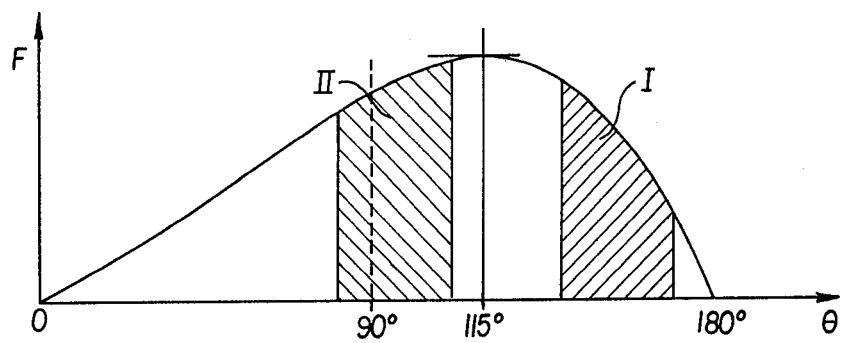
FIG. 2 is a curve representing the changes in the force exerted by a dead-head system as a function of the angle $\theta$ between the straight line joining the center of gravity of the active mass of each dead-head to its pivot axis and the radial plane passing through said pivot axis.

Referring now to FIG. 2, we see a representation of the changes in force F exerted by a dead-head system of the type used in systems 20 and 22 on a movable body of the type used in body 48, this being a function of the angle $\theta$ (see FIG. 1) between the straight line joining the center of gravity G of the active mass of the dead-heads to their pivot axis and the radial plane passing through said pivot axis. This figure shows that the tension from the dead-head system $dF/dx$, i.e., the change in axial force F exerted by said system on the movable body as a function of the displacement X of the movable body, may be positive, negative, or largely constant depending on the characteristics of the dead-heads. Accordingly, the tension from the dead-head system is positive when the angle $\theta$ remains between 0° and 100° and negative when the angle $\theta$ is between 130° and 180°, while it is closed to nil when the angle $\theta$ is in the vicinity of 115°.

In the variant manner of production represented in FIG. 1, the sum of the tensions from the two dead-head systems 20 and 22 is negative. In the case of FIG. 1, this result is obtained by selecting two identical dead-head systems each of which has negative tension corresponding, for example, to the operation area I in FIG. 2. However, this result could also be obtained by using two different dead-head systems, in which case the two systems could either both have negative values or could have tensions with opposite signs, the tension of the negative-tension system then being by its absolute value greater than the tension of the positive-tension system (operation areas I and II in FIG. 2).

Figure 3:
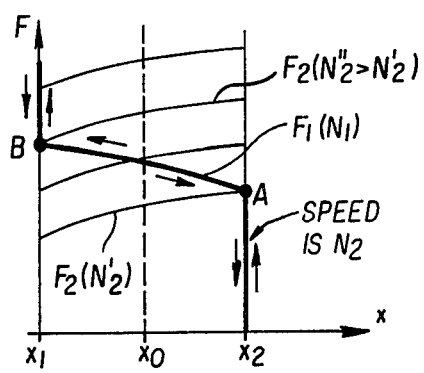
FIG. 3 is a curve representing the changes in the opposing forces exerted on the movable body by the dead-head systems as a function of the body's movement in the device represented in FIG. 1.

In order to describe the functioning of the device represented in FIG. 1, reference is made to FIG. 3, which represents the changes in the opposing forces $F_1$ and $F_2$ exerted by the dead-head systems 20 and 22 on the movable body 48 as a function of the displacement x of that body. In this first variant production of the invention, which is characterized by the fact that the sum of the tensions from the dead-head systems 20 and 22 is negative, it is noted that every position of the movable body 48 between end positions $x_1$ and $x_2$ that it might occupy is a stable position. As an aid to understanding, it has been assumed in FIG. 3 that the speed of rotation $N_1$ of shaft 12 is constant, so that a single curve represents the change in force $F_1$ depending on the displacement x of the movable body 48 between its end positions $x_1$ and $x_2$.

As FIG. 3 shows, the movable body 48 remains at $x_2$ so long as the shaft 14 revolves at a speed $N_2$ below the speed $N'_2$ for which the value of the force $F_2$ at $x_2$ becomes equal to the value of the force $F_1$ at $x_2$. When the speed of rotation $N_2$ of the shaft 14 is greater than speed $N'_2$, the value of the force $F_2$ at $x_2$ becomes greater than the value of the force $F_1$ at $x_2$, so that the movable body 48 begins to advance from $x_2$ toward $x_1$. The point representing equilibrium for the body 48 then moves from A toward B in FIG. 3. As soon as forces $F_1$ and $F_2$ become equal, which occurs at the intersection of the curves representing forces $F_1$ and $F_2$, the movable body 48 becomes stationary between end positions $x_1$ and $x_2$. Each intermediary position between the end positions $x_1$ and $x_2$ therefore defines a stable position for the movable body 48. Each of these stable positions for the movable body 48, assuming that the speed $N_1$ of the shaft 12 is constant, corresponds to a given value of the speed $N_2$ of the shaft 14, this value being between $N'_2$ and $N''_2$. However, when the speeds $N_1$ and $N_2$ are both variable, each of the stable positions of the movable body 48 corresponds to a given value of the difference between speeds $N_1$ and $N_2$.

The stable nature of the intermediary positions of the movable body 48 is shown in FIG. 3 by the existence of points of intersection between the curves representing forces $F_1$ and $F_2$ when the speed of rotation of the shaft 14 is between speeds $N'_2$ and $N''_2$. This characteristic is therefore attributable to the fact that the sum of the tensions of the dead-head systems 20 and 22 is negative in this first variant of the invention. Of course, when the point representative of equilibrium for the movable body 48 reaches B, i.e., when the movable body 48 reaches $x_1$, which occurs when the speed of rotation of the shaft 14 is equal to or greater than $N''_2$, any increase in force $F_2$ induces no change in the equilibrium of the device.

In the first variant of the invention represented in FIG. 1, the position of the movable body 48 between its end positions $x_1$ and $x_2$ is therefore representative of the difference between the speeds of rotation of the shafts 12 and 14. This property may be used to make a measurement of the difference by using the movable body as an indicator after having manufactured a scale.

This property may also be used to control the speed of rotation of the shaft 14, making it dependent on the speed of rotation of the shaft 12, or vice versa. In the method of production represented by way of example in FIG. 1, this control is intended to make the speed of shaft 14 equal to the speed of shaft 12. To that end, a detector 50 is placed in the housing 10 for purposes of detecting the displacement of one or more reference marks 52 made on the movable body 48. The signals provided by the detector 50 are transmitted to a control system 54 which governs the rotation of the shaft 14 so as to correct the speed of rotation of the latter as a function of the information received by the detector 50. The dead-head systems 20 and 22, moreover, are identical, so that the curves representing the forces $F_1$ and $F_2$ are symmetrical and opposite in slope in FIG. 3. The movable body 48 is thus permanently maintained at a point equidistant from its end positions $x_1$ and $x_2$, so that the point representing this equilibrium is always at $x_0$ in FIG. 3.

Of course, the device represented in FIG. 1 may be used for more complex control systems. Accordingly, this device may be used in an unmodified form to make the speed of rotation of a regulated system equal to a multiple of submultiple of the speed of rotation of the reference system. A multiplication or demultiplication mechanism, using gears, for example, is then placed between one of the systems and the corresponding shaft, 12 or 14, of the device according to the invention. Much more complex control systems can still be produced, for example by using a hydraulic amplifier whose slide valve would be the movable body 48, the body itself being mounted in an equally movable sleeve. Depending on the function to be carried out, the displacement of the sleeve can be controlled by a standard type of dead-head detector, for example, sensitive to the speed of rotation $N_1$ of the shaft 12, if the speed of rotation $N_2$ of the shaft 14 is to be controlled by that speed $N_1$, or perhaps by a device detecting the difference in pressure $\Delta P$. The function itself is defined by a cam made integral with the movable body of the speed detector or pressure difference detector, against which is applied a roller supported by a lever controlling the displacements of the hydraulic amplifier. Controls of the type $N_2 = N_1 \times f(N_1)$ or $N_2 = N_1 \times f(\Delta P)$ may thus be effected.

Figure 4:
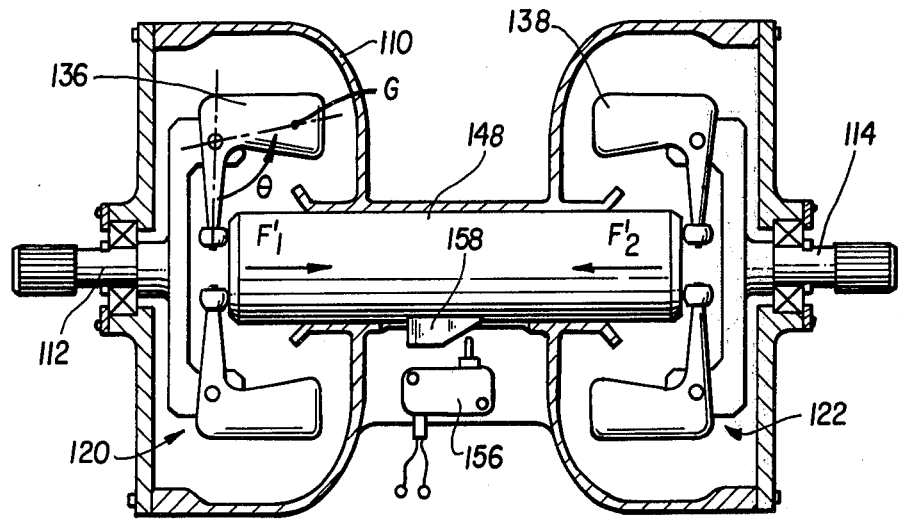
FIG. 4 is a longitudinal cross section similar to FIG. 1 representing another way of producing the device according to the invention, in which the sum of the tensions from the two dead-head systems is positive.

In the second production variant of the invention, represented in FIG. 4, the detection device is almost identical to the device represented in FIG. 1, the sole difference being in the configuration of the dead-heads 136 and 138 of the dead-head systems 120 and 122. In fact, the form of the dead-heads 136 and 138 is such that the sum of the tensions from each of the dead-head systems 120 and 122 is positive. More specifically, in the production mode represented, the dead-head systems 120 and 122 are identical and the tension from each is positive, which results from the fact that the angle $\theta$ is at all times less than approximately 100°. The operating area of each of the dead-head systems is of the same type shown in area II in FIG. 2.

Figure 5:
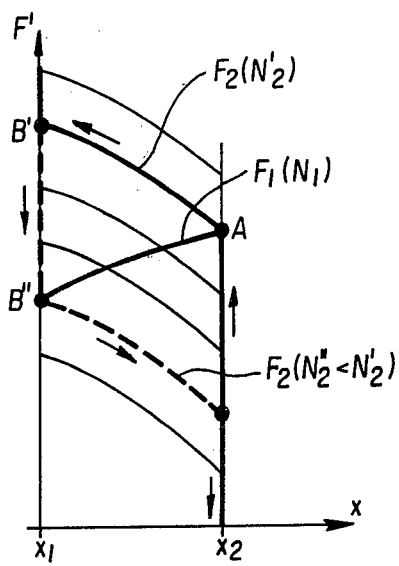
FIG. 5 is a curve representing the changes in the opposing forces exerted on the movable body by the dead-heads as a function of the body's displacement within the device represented in FIG. 4.

Reference is now made to FIG. 5, which represents the changes in the opposing forces $F_1$ and $F_2$ exerted by each of the dead-head systems 120 and 122 on the movable body 148 as a function of the displacement x of the latter between its two end positions $x_1$ and $x_2$. In this variant, the device according to the invention functions in a manner which is totally different from the variant represented in FIG. 1, in that it can occupy only two stable positions, corresponding to the end positions $x_1$ and $x_2$. To simplify, in FIG. 5 we have represented only one curve F corresponding to a clearly determined value $N_1$ for the speed of rotation of the shaft 112.

Assuming that the movable body 148 originally occupies position $x_2$, that body remains in that position until the value of the force $F_2$ at $x_2$ becomes slightly greater than the value of force $F_1$ at $x_2$, i.e., past point A. This condition comes about when the speed $N_2$ of the shaft 114 becomes slightly greater than a value $N'_2$ or, assuming that the speed $N_1$ of the shaft 112 is also variable, when the difference between speeds $N_1$ and $N_2$ reaches a value determined by the manner of construction. The movable body 148 is then displaced toward $x_1$, with the result that the difference between the force $F_2$ and the force $F_1$ is increased, thereby accelerating the displacement of the body 148. The movable body 148 is thus displaced suddenly to the point $x_1$, thereby attaining the point of equilibrium B' in FIG. 5. Thus there is no intermediary point of equilibrium between points A and B', which is illustrated in FIG. 5 by the absence of points of intersection between the curves representing forces $F_1$ and $F_2$ when the speed of rotation of the shaft 114 is greater than the velocity $N'_2$.

In this production variant, the device has an hysteresis. In fact, the return of the movable body 148 to $x_2$ which results from a drop in the speed of rotation $N_2$ of the shaft 114 associated with the dead-head system 122 will not occur until point B'' in FIG. 5, i.e., when the speed $N_2$ becomes less than a speed $N''_2$ which is less than speed $N'_2$ and for which the value of force $F_2$ at $x_1$ becomes less than the value of force $F_1$ at $x_1$. If it is assumed that the speed of rotation $N_1$ of the shaft 112 is also variable, it can than be said that the displacement of the movable body 148 is then sensitive to a second threshold of difference in speeds $N_1$ and $N_2$. Then the movable body 148 is suddenly displaced from $x_1$ toward $x_2$ insofar as an increase in the difference between the force $F_1$ and the force $F_2$ corresponds to any movement from $x_1$ toward $x_2$.

In the variant shown in FIG. 4, the device according to the invention may thus be used to trigger, in a clearcut way, a control system for an automatic device such as a micro circuit breaker 156 attached to the housing 110. The micro circuit breaker 156 might be triggered, for example, by means of a cam 158 on the movable body 148 when the difference between the speeds of rotation of the shafts 112 and 114 exceeds the thresholds corresponding to points A and B'' in FIG. 5. To be sure, the micro circuit breaker may be replaced by any other type of control system such as a hydraulic or pneumatic valve.

The possible applications of the device according to the invention are numerous and varied. Thus the production variant in FIG. 1 may, in particular, be used in a jet engine to control the shaft which governs the flow of fuel in accordance with the stator blade adjustment system or with the nozzle configuration control, or even to register the velocity difference in a twin spool turbojet.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for detecting a differential angular velocity between a first and a second revolving shaft comprising:
    a first dead-head system for producing a first centrifugal force at a first angular velocity and a first tension operatively associated with said first shaft,
    a second dead-head system for producing a second centrifugal force at a second angular velocity and a second tension operatively associated with said second shaft and disposed opposite said first dead-head system;
    a movable body disposed between and operatively associated with said first and said second dead-head systems such that said first and said second centrifugal forces are opposingly applied to said movable body and wherein a sum of said first tension and said second tension is negative such that a displacement of said movable body is representative of said differential angular velocity.

2. A device according to claim 1 wherein said first dead-head system and said second dead-head system are identical dead-head systems.

3. A device according to claim 1 or 2 further comprising indicating means operatively associated with said movable body.

4. A device according to claim 1 or 2 further comprising:
    at least one detector for detecting displacement of said movable body and for generating signals corresponding to said displacement; and
    control means for modifying said differential angular velocity in response to said signals such that said differential angular velocity is maintained at about a value of zero.

5. A device according to claim 1 or 2 further comprising:
    control means for regulating said first angular velocity with respect to said second angular velocity and wherein said second dead-head system further comprises a reference system;
    said movable body further comprising a slide of a hydraulic amplifier,
    means for connecting said slide to said control means;
    a movable sleeve operatively associated with said hydraulic amplifier such that said slide moves within said movable sleeve;
    a cam operatively associated with said movable body for displacing said sleeve in response to a physical parameter such as said differential angular velocity or a pressure.

6. A device for detecting a differential angular velocity between a first and a second revolving shaft comprising:
    a first dead-head system for producing a first centrifugal force at a first angular velocity and a first tension operatively associated with said first shaft;
    a second dead-head system for producing a second centrifugal force at a second angular velocity and a second tension operatively associated with said second shaft and disposed opposite said first dead-head system;
    a movable body disposed between and operatively associated with said first and said second dead-head systems such that said first and said second centrifugal forces are opposingly applied to said movable body and wherein a sum of said first tension and said second tension is positive such that said movable body moves abruptly between a first and a second extreme position respectively in response to a first and a second predetermined differential angular velocity.

7. A device according to claim 6 further comprising:
    a control system operatively associated with said movable body; and
    a cam supported by said movable body for freely disengaging said control system.

8. A device for detecting a differential angular velocity between a first and a second revolving shaft comprising:
    a first dead-head system for producing a first centrifugal force at a first angular velocity and a first tension operatively associated with said first shaft,
    a second dead-head system for producing a second centrifugal force at a second angular velocity and a second tension operatively associated with said second shaft and disposed opposite said first dead-head system;
    a movable body disposed between end portions of said first shaft and second shaft and operatively associated with said first and said second dead-head systems such that said first and said second centrifugal forces are opposingly applied to said movable body and wherein a sum of said first tension and said second tensions is negative such that a displacement of said movable body is representative of said differential angular velocity.

* * * * *